Figure 1:
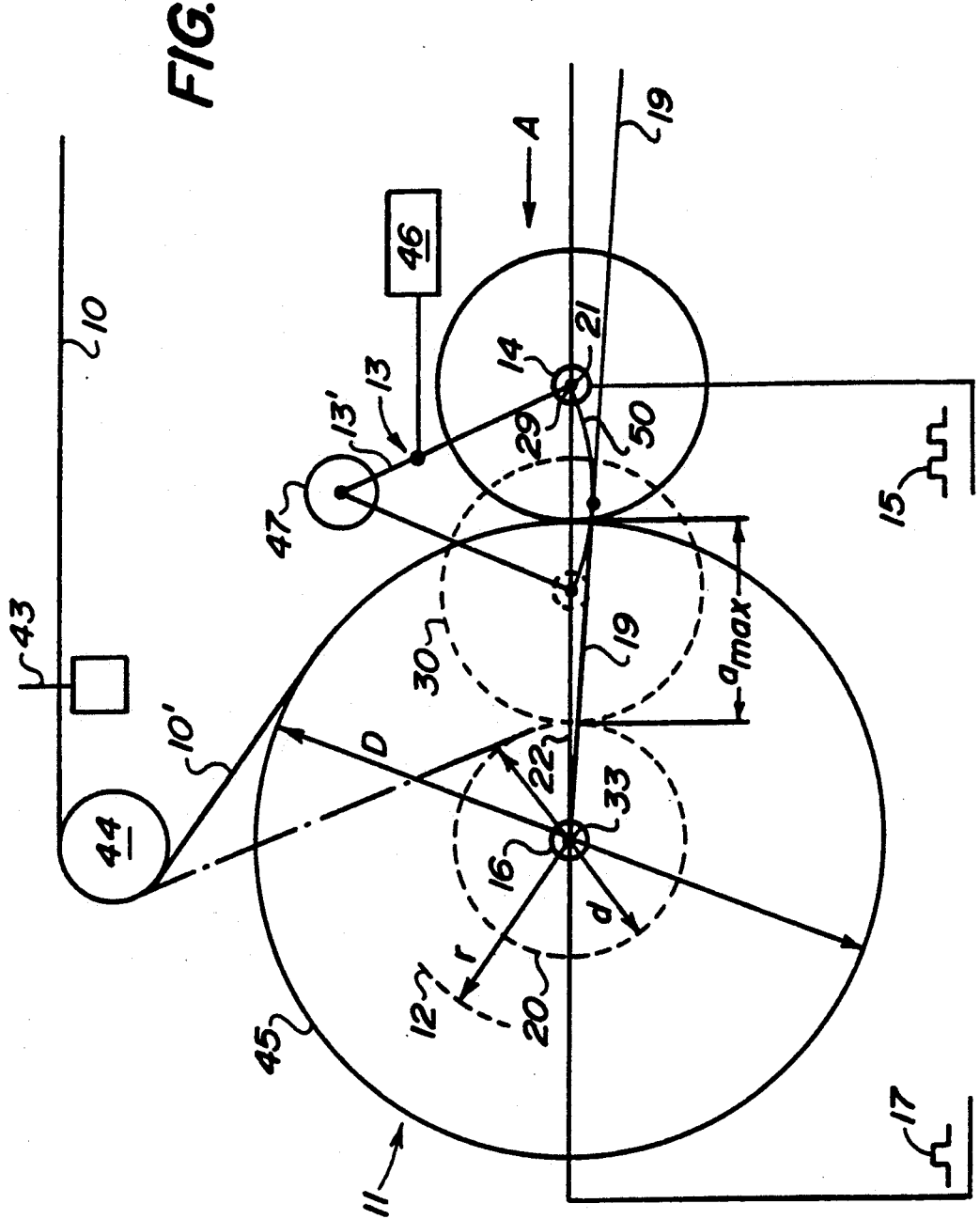

United States Patent [19]

Buttermann

[11] Patent Number: 5,257,462
[45] Date of Patent: Nov. 2, 1993

[54] APPARATUS FOR MEASURING THE LENGTH OF FILAMENTOUS TEXTILE MATERIAL

[75] Inventor: Günther Buttermann, Nettetal, Fed. Rep. of Germany

[73] Assignee: Hacoba Textilmachinen GmbH & Co., Wuppertal, Fed. Rep. of Germany

[21] Appl. No.: 847,647

[22] Filed: Mar. 6, 1992

[30] Foreign Application Priority Data

Mar. 9, 1991 [DE] Fed. Rep. of Germany ... 9102864[U]

[51] Int. Cl.$^5$ .......................... G01B 5/04; G01B 7/04
[52] U.S. Cl. ........................................ 33/732; 33/733; 33/738; 33/754
[58] Field of Search ............... 33/732, 733, 734, 735, 33/738, 739, 740, 746, 747, 750, 754

[56] References Cited

U.S. PATENT DOCUMENTS

| | | | |
|---|---|---|---|
| 1,985,228 | 12/1934 | Borroughs | 33/733 |
| 2,330,909 | 10/1943 | Olson | 33/733 |
| 2,912,763 | 11/1959 | Loewe et al. | 33/733 |
| 3,158,938 | 12/1964 | Philipps et al. | 33/733 |
| 3,310,172 | 3/1967 | Beduhn | 33/740 |
| 3,739,276 | 6/1973 | Dornberger | 33/732 |
| 3,916,174 | 10/1975 | Moule | 33/732 |
| 4,574,598 | 3/1986 | Matthelié | 33/732 |
| 4,635,216 | 1/1987 | Stutz et al. | 33/734 |
| 5,065,527 | 11/1991 | Shaw | 33/734 |

FOREIGN PATENT DOCUMENTS

0457323 11/1991 European Pat. Off. .............. 33/734

Primary Examiner—William A. Cuchlinski, Jr.
Assistant Examiner—C. W. Fulton
Attorney, Agent, or Firm—O'Keefe & Wilkinson

[57] ABSTRACT

Apparatus for measuring the length of textile material wound onto a lap beam and in particular, onto a dyeing beam, having (a) a pressure roll bearing upon the beam lap and mechanically connected with a displacement detecting transducer that emits measurement impulses, (b) a beam-driven shaft encoder that emits a predetermined number of calculation impulses for each revolution of the beam, and (c) a computer that calculates the partial lengths of the laps (lt) from the measurement impulses and the calculation impulses. The displacement detecting transducer is movably or slidingly interengaged with an elongated linear member in the form of a toothed rack hinged so that a projection of one end always intersects the longitudinal axis of the lap beam. A correction read-out is calculated from the diameter of the axle of the lap beam and the position of the point of interengagement of the elongated linear member with the displacement detecting transducer through the pressure point of the pressure roll bearing upon material wound upon the lap beam and the number of rotations of the lap beam.

16 Claims, 3 Drawing Sheets

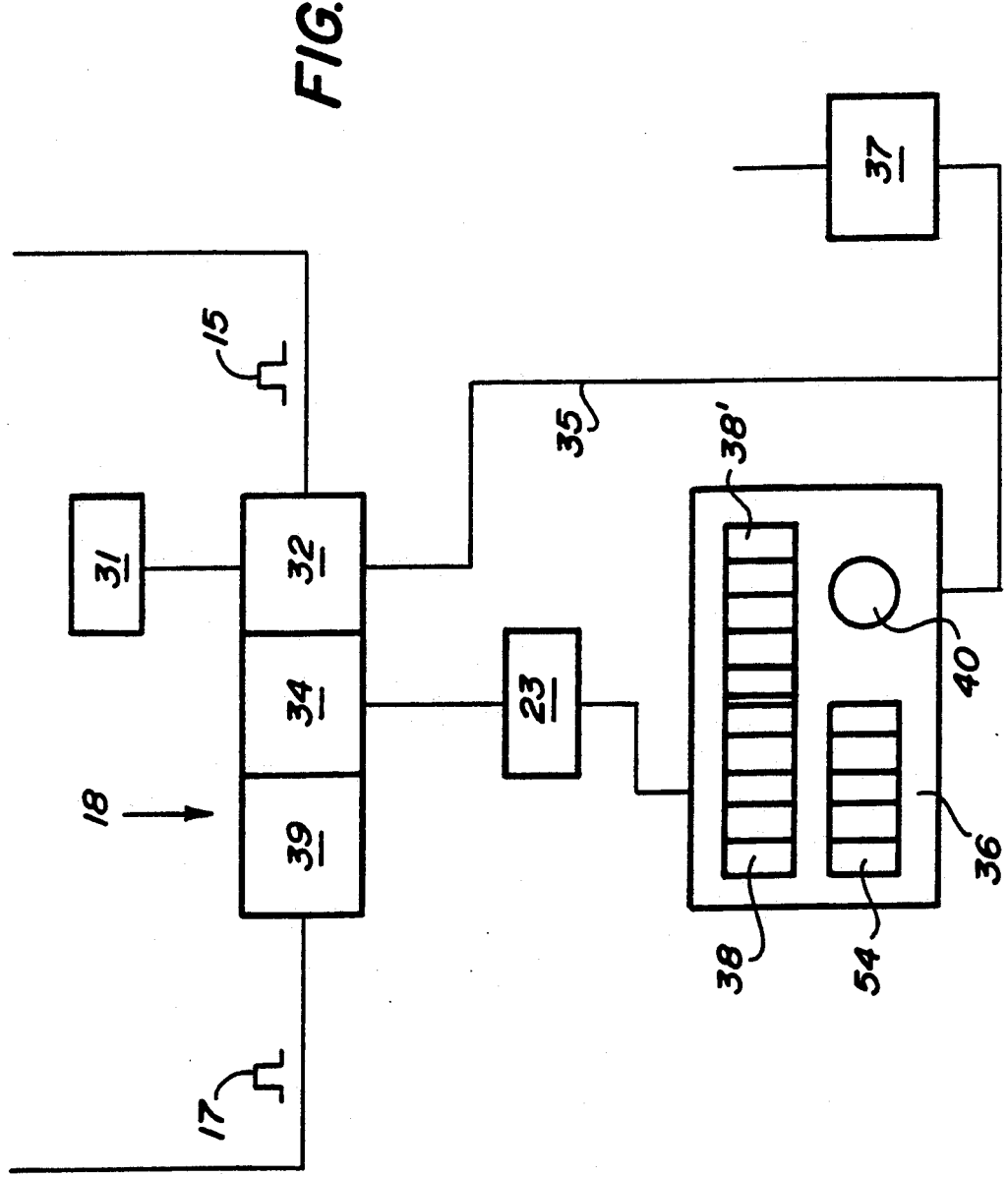

APPARATUS FOR MEASURING THE LENGTH OF FILAMENTOUS TEXTILE MATERIAL

The invention relates to an apparatus for measuring the length of textile material in filamentous form that is wound onto a lap beam as a yarn sheet, in particular, onto a dyeing beam, consisting of an apparatus that applies pressure to the beam lap in the course of the winding process, which is mechanically coupled with a displacement transducer that measures the radius of the lap in question, of a beam-driven shaft encoder, which emits a predetermined number of computational signals, and consisting of a computer, which computes partial lengths of the lap by means of the measurement signals and the computational signals, and adds them.

Such an apparatus is known from the German patent application DE 39 00 296 A1. The apparatus that applies pressure consists, substantially, of a compression roller held in such a way by a supporting arm that it may be slewed. The displacement transducer determines this supporting arm's angle of slew, and it causes a pulse generator to emit measurement impulses in keeping with the angle of slew, by means of which the computer then computes partial lengths of the lap. It has been shown, however, that these calculations are not sufficiently precise; for alternations in the angle of slew of the compression roller's supporting arm are only exactly proportional to the actually occurring alternations of radius if the supporting arm is substantially perpendicular, to horizontal as a result of the axis of the beam. Meanwhile, it should be kept in mind that the laps of several beams, if necessary, are built up in different ways, so that, based solely upon the measured angle of slew, it is impossible to draw any conclusions pertaining to the length of the lap. Due to structural differences in laps, errors of varying degrees of severity can arise as a result of measuring the angle of slew, so that different beams can exhibit laps of differing lengths. Measuring different beams by the same error-ridden method, thus does not result in the saem winding lengths. Even slightly erroneous measurements can give rise to considerable differences of length between lap beams in the further processing of the completely wound beams, which cannot be accepted, particularly in the case of warping. The warping of a large number of beams must be completed when the shortest lap is completely wound. The residual lengths of textile material left over on the other beams may not be used and they must be destroyed, which signifies or entails a considerable loss, which, understandably, therefore, cannot be tolerated.

It is generally known how to use the compression roller of the compression apparatus so as to conduct measurements of length. For the compression roller is then pressed against the lap, and, accordingly, it turns in keeping with the textile material that has been wound. It has been shown, however, that this rotation is not free of slippage. In the case of dyeing beams in particular, which require a lap thickness of 0.3, slippage occurs, which gives rise to faulty measurements. That applies in particular to the braking and acceleration phase.

It is thus the underlying task of the invention to improve an apparatus having the features enumerated at the outset in such a way that a precise measurement of the length of the material that is to be wound is possible, particularly in conjunction with compression devices that apply slight pressure.

This task is met by virtue of the fact that the displacement transducer of the apparatus applying the pressure is in mesh with a staff that maintains distance by means of a sliding joint, which is also hinged in such a way as to intersect the beam's longitudinal axis, and such that the computer exhibits a correction apparatus that permits the consideration of the diameter d of the axle of the lap beam and the position of the pivoting point of the compression apparatus with regard to the pressure point of the compression apparatus.

A crucial element of the apparatus is the distance staff, which renders exact consideration of the position of the pressure point on the lap possible in all positions. The coupling, which intersects the axle of the beam, is particularly advantageous in this regard, even though, for example, a coupling at another fixed point relative to the axle of the beam would be possible, for which purpose, then, a correction factor that arises from the geometry of this particular coupling point would have to be given due consideration by the computer. The computer can take the diameter of the axle of the lap beam into account so that the lap radius at the application of the pressure point on the lap beam can effectively be determined by means of zero, or adjusted. In addition, the computer can consider the position of the pivoting point of the distance staff on the compression apparatus. The computer has correction apparatus for both corrections, which is adjusted for the structural conditions that prevail in the case of the apparatus.

The apparatus is constructed preferably in such a way that the distance staff is a toothed rack, one end of which is pivoted by means of an articulated ring at the beam axle input appliance of the lap apparatus, and the other end of which is held by a mounting that permits axial movements in mesh with a pinion of the displacement transducer. As a result of the pivot at the beam axle input appliance, the distance staff, or rather, toothed rack, is arranged in a particularly simple way so as to intersect with the beam axle, and it does so outside the area of movement of the lap beam. The sliding articulated meshing of the distance staff with the displacement transducer is achieved by means of a mounting to which the pinion of the displacement transducer is affixed.

So that the compression roller can press against the lap between the beam flanges of the lap beam unhindered by measuring apparatus, the displacement transducer is hinged at a supporting arm of a compression roller of the compression apparatus, which may be located outside that area that meshes between the beam flanges.

It is particularly advantageous that the distance staff be arranged so as to be in alignment with the axle of the compression roller, and, that the mounting of the distance staff be connected by means of an articulation with the supporting arm of the compression roll. Consequently, not only does the distance staff pass through the beam's longitudinal axis, it also passes through the axis of the compression roller, and thus, through the pressure point of the compression roller on the beam lap. Consequently, errors that are due to the angle are precluded, or rather, correction factors arising from the geometry of deviant pivoting points of the distance staff on the compression apparatus, need not be considered by the computer.

The apparatus is configured in such a way that the computer's correction apparatus is an adjusting circuit of a counter of the computer that is activated by the displacement transducer and such that the counter with the adjusting circuit may be adjusted to the maximum possible distance of the pressure point of the compression roller from the beam axle prior to beginning the lap. The adjusting circuit makes it possible to adjust the counter to a selected value, and, to good purpose, to the maximum possible distance of the pressure point of the compression roller from the axle of the beam. This distance is simple to determine by virtue of the fact that the compression roller is arranged so as to be as far as possible from the beam axle, following which a gauge between the beam axle and the pressure point renders it possible to determine the desired distance. This distance is then fed into the counter by means of the adjusting circuit. If the compression roller is then driven against the beam axle, the computer correctly begins to count at zero. By means of a single setting, all potential errors are precluded, especially various axle diameters of the lap beam, and various arrangements of the pressure point, for example, as a result of varied diameters of the compression roller. If none of the values change, the counter can, without prior, repetitive measuring, be set to the initial setting, which was determined prior to the first lap, or a reset button is used to set the counter to zero before the next lap is produced.

In order to be able to determine the length of the material that has been wound, the apparatus is so constructed that the computer has a multiplication element that can be retriggered by every computational impulse and subsequently, it can calculate a partial length of a lap from a lap radius that was determined by means of measurement impulses, and, by means of a constant value that was determined by the number of calculating impulses per revolution of the lap beam. All calculated partial lap lengths are added to the total lap length by the computer or by means of a calculating element of the computer.

Since the individual lap radius is always known to the computer from the measurement impulses, the apparatus is configured in such a way that the computer has an outlet for an electrical quantity that is proportional to the radius of the lap, and such that the outlet for monitoring and/or influencing the hardness of the lap is connected to an indicating and/or controlling or regulating apparatus. In principle, the density of the lap, which is needed to determine whether the lap is suitable for dyeing, may be derived from the radius of the lap. A lap density that is too great, for example, would mean an uneven dyeing of the textile material, which is in filamentous form. Such an inadmissible lap density would be present if the lap radius of the completely wound beam were too small. In practice, there are indicator values for the correct lap radius, values which, thus far, have generally been determined by virtue of the fact that the distance between the lap circumference and the edge of the beam flange was measured. The present apparatus renders such measuring procedures superfluous. It even makes determining the lap radius possible while the lap is being constructed, that is, during winding, so that in principle, it is possible to exert an influence upon the hardness of the lap even during the winding process.

The invention is illustrated by virtue of an example of an embodiment that is represented in the drawing.

Figure 3:
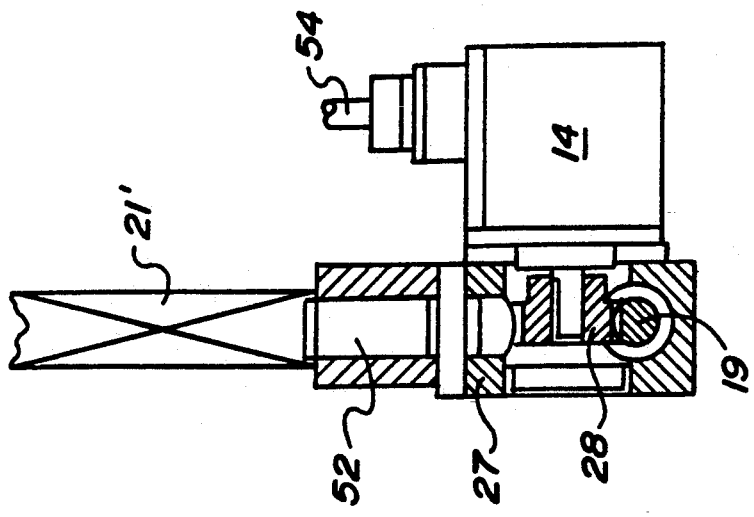
Figure 2:
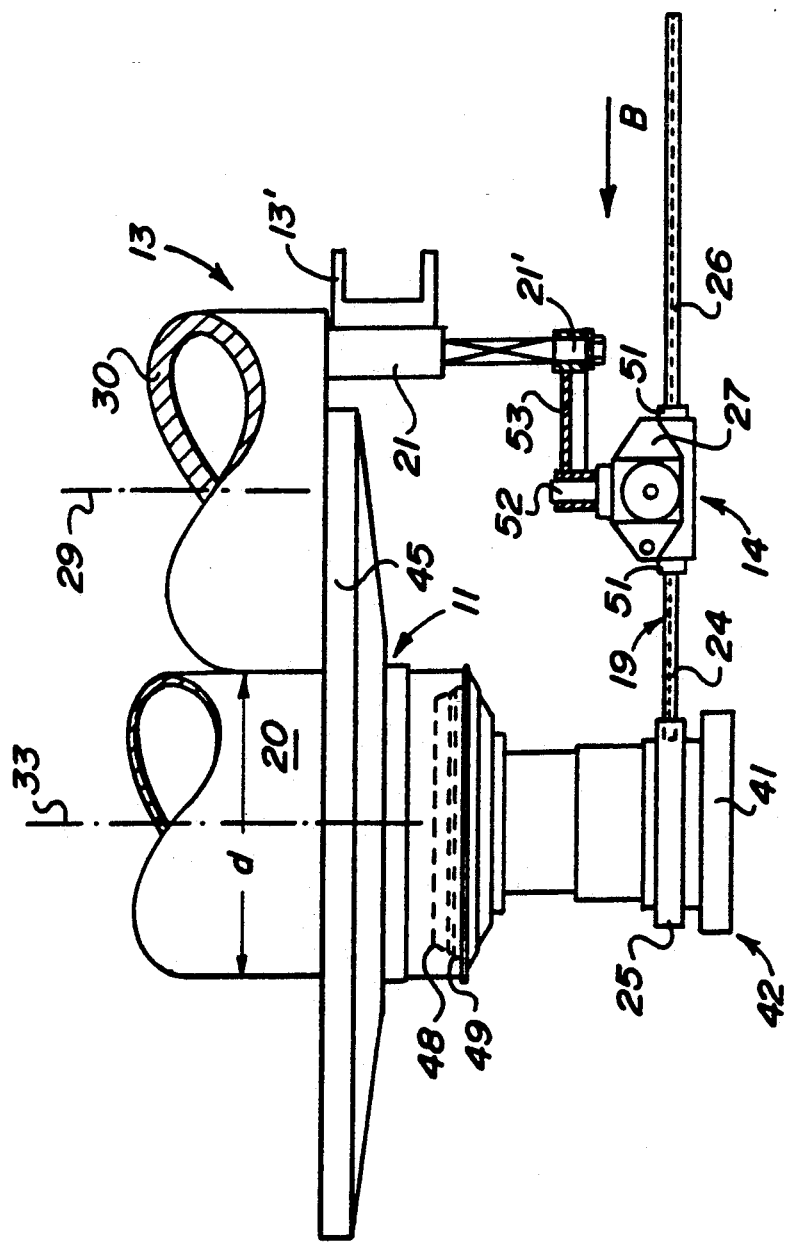

FIG. 1 shows a schematic representation of a winding apparatus with compression apparatus, in lateral view, FIG. 2 shows a view in direction A of FIG. 1 in the terminal area of the lap beam, FIG. 3 shows a partial view in direction B of FIG. 2, in a partially cut-away representation, and FIG. 4 shows a schematic representation of calculating the length of lap after the manner of a block circuit scheme.

FIG. 1 illustrates a lap beam, 11, onto which the textile material 10, in the form of a yarn sheet, is to be wound. The yarn sheet passes through a guiding reed, 43, and is redirected by a deflecting roller, 44 in such a way that it can be wound onto the beam axle, 20, which is represented by the broken line. As winding progresses, there develops, between beam axle 20 and the outer contour of the beam flanges, 45, a beam lap, 12, with the lap radius r, which corresponds minimally to half the diameter d of the beam axis 20, and maximally to half the diameter D of the beam flanges, 45. In the former case, the course of the yarn sheet 10 runs between the deflecting roller 44, and beam axle 20, as is shown by the broken line; in the latter instance, the yarn sheet 10 follows a path that is represented by an unbroken line, 10'.

The winding apparatus, 42, is equipped with a contact pressure apparatus, 13 for purposes of smoothing the surface of the lap. The latter must, particularly in the case of the production of laps of low lap thickness, apply only light pressure against lap 12. This applied pressure may be adjusted by means of a pressure cylinder, 46, which may be controlled by pneumatic or hydraulic means. It makes contact with a supporting arm, 13', which is seated on bearings so as to pivot at a joint, 47, which supports, at its other end, an axle, 29 of a compression roller, 30. For the structural embodiment of this supporting arm 13', attention is called to FIG. 2, in which the supporting arm 13' is represented as a U-shaped profile in which it is understood that the compression roller, 30, is secured at both ends. The mounting is accomplished in each case by way of a coupling point, 21, in a manner that is not explained in any greater detail. It is thus understood, for example, that the compression roller 30, with reference to its coupling point 21, is seated on bearings in a manner that is not depicted, in such a way as to rotate. Since such constructions are basically known, they are not represented in FIG. 2 and in FIG. 1, the coupling point 21 is indicated as being centric to the compression roller, 30.

From FIG. 2, it may be seen that the beam axle 20, or rather the beam flanges 45, have an interior cone 48, into which an external cone, 49, of a beam axle input appliance, 41 of the winding apparatus 42, meshes. The beam, 11, is held up by means of this apparatus, 41.

From FIG. 1 it may be seen that the compression apparatus, 13, can slew the compression roller so far that the compression roller 30 can lie against both the outer contour of the beam axle 20 as well as against the maximum possible external contour of the completed lap, 12, which approximately corresponds to the external diameter, D, of beam flange 45. Both positions of the compression roller, 30, are represented by broken, or unbroken lines. Roller axle 29, which coincides in FIG. 1 with coupling point 21, moves in an arc, 50.

As a distinctive feature, the apparatus in keeping with the invention exhibits a distance staff, 19, an elongated linear member which intersects the longitudinal axis of the beam, 33 and which is connected, by means of a sliding articulation with a displacement transducer, 14. In accordance with FIG. 2, the distance staff, 19, is a toothed rack. One of its ends, 24, is attached to an articulated ring, 25, which surrounds and grips the beam axle input appliance, 41, thus intersecting the axis, 33, of the lap beam, 11, when the lap beam is in operational position.

The displacement transducer, 14, as a result of mounting 27, which permits a relative shift between the mounting, 27, and the toothed rack, and which, in addition, allows relative changes in the position of the displacement transducer, 14, to the supporting arm, 13' of the compression contrivance, 13, is meshed in a particular manner with the distance staff. For the displacement of the distance staff, 19, relative to the mounting, 27, the latter has two movable bushings, 51. In addition, it is equipped with a trunion, 52, which is arranged so as to be perpendicular to the distance staff 19 in the plane of presentation, and which forms the bearing site of a crank, 53, which is attached by its other end to the offset end, 21' of the point of articulation, 21. The point of articulation, 21' is thus a point of articulation for distance staff 19. If the postion of compression roller 30 in FIG. 2 changes as a result of increasing lap radius r, the roller is pushed toward the outside, and the crank arm 53 is slewed counterclockwise to the perpendicular in relation to the plane of presentation, so that the mounting 27, relative to the distance staff 19, is moved toward the right. In this process, a pinion gear, 28, of the displacement transducer, 14, rolls down the rack, or rotates, so that the displacement transducer, 14, which is constructed in such a way as to be an incremental transmitter, can emit corresponding measuring impulses via a connection line, 54. The measurement impulses that are emitted by the displacement transducer, 14, are schematically represented in FIG. 1 and FIGS. 4 by 15.

In addition, computational impulses, 17, which are produced by a shaft encoder, 16, which is schematically represented in FIG. 1, and rigidly connected to beam axle 20, are indicated in FIG. 4. This shaft encoder consists substantially of an impulse transmitter, which is activated at each revolution of the beam axle, 20, by one or more proximity switches, which are not depicted, which move around with the beam, and are attached, for example, to the beam axle input appliance, 41, or to a disk that is attached thereto. The impulses, 15, 17, that are generated by the proximity switches, which are distinguishable for forward and reverse operation, so that they are evaluated accordingly by the counter, 32, are fed to a computer 18, which calculates partial lap lengths, it. The following formula applies to the partial length of a complete revolution of the lap beam:

$$lt_u = 2 \times \pi \times r$$

A calculation of this sort can be carried out if a computation impulse is emitted per revolution. If, for the purpose of more precise partial calculation, four computation impulses, 17, are emitted, it holds true that:

$$lt_u/4 = r \times \pi/2$$

Computer 18 conducts such calculations of partial length by means of the multiplication element, 34, which is activated by means of a controlling circuit 39, which is bombarded by the measurement impulses 17. In its calculations, the multiplication element, 34, employs the measurement of the lap radius, r that is present in counter 32, which is provided by the displacement transducer 14. Depending upon the construction of the displacement transducer, the measurement is available in digital form, as indicated by measurement impulse 15, or the displacement transducer 14 provides an analogue reading, which is either used directly by counter 32, or digitalized.

The partial lap lengths, $lt_x$, which are determined by multiplication element 34, must be added to arrive at the total length, which is accomplished by addition element 23. By way of example, using various values for r, the addition element, 23, calculates as follows:

First revolution x with four calculation impulses, 17:

$$lt_{x1} = 1.57 \times 50 = 78.5$$

$$lt_{x2} = 1.57 \times 51 = 80.07$$

$$lt_{x3} = 1.57 \times 52 = 81.64$$

$$lt_{x4} = 1.57 \times 53 = 83.21$$

Second revolution x+1 with four measurement impulses, 17:

$$lt_{(x+1)1} = 1.57 \times 54 = 84.79$$

$$lt_{(x+1)2} = 1.57 \times 55 = 86.35$$

$$lt_{(x+1)3} = 1.57 \times 56 = 87.92$$

$$lt_{(x+1)4} = 1.57 \times 57 = 89.49$$

The adder, 23, computes from this the total length of 671.96 for the two revolutions examined here. This sum is indicated in length display 38. Length display 38 of indicator unit 36 thus permits an ongoing reading of the total length. Once a predetermined total length has been reached, the machine can be turned off if a limitation switch has not previously been activated, because the beam, 20, is fully wound. In order to be able to turn off the winding apparatus 42, to good effect, or rather, its power source, a display, 38' is present for a pre-determined shut-off value, which is set prior to beginning to lap such that once that value was reached, the winding machine would be automatically switched to a crawl, so that, given its slow rate of winding, it can be shut off at exactly the proper length.

The indicator apparatus, 36, also has a display, 54, for the radius of the lap r, which is always available from the counter, 32, from which it passes, via outlet 35 into the indicator apparatus, 36. With the aid of this display 54, it is possible to check whether lap 12, at the desired total length, which is indicated by display 38, has the desired lap radius r, which is a measure of the hardness of the lap 12, and is thus a measure of the density, or of its suitability for dyeing.

It may be seen from FIG. 4 that counter 32 is struck by an adjusting circuit. By means of this adjusting circuit 31, the counter may be set to a definite value prior to beginning winding. This predetermined value corresponds to the maximum possible distance, $a_{max}$ of the pressure point of the compression roller 30 from the beam axle, 20. It is thus possible to slew mounting 13', and with it, the compression roller 30 in FIG. 1, counterclockwise as far as the position depicted by the unbroken line, so that pressure point 22 achieves its maximum possible distance from beam axle 20. The position of the pressure point 22 does not as a rule, coincide with the outer contour of beam flange 45, as is depicted in FIG. 1. The distance is measured and entered as a maximum lap radius, $r_{max}$. Then the compression roller 30, is slewed into the facility on the beam axle, 20, that is represented by the broken line, at which point the counter 32 exhibits the value zero. Taking zero as its point of departure, the lap radius r can be determined based upon the number of revolutions of the lap beam, 11. If an empty lap beam is wound, the zero setting can be set by the reset button, 40, which is present on the indicator apparatus, 36, if nothing has changed in the dimensions of the lap arrangement.

I claim:

1. An apparatus for measuring the length of filamentous textile material wound onto a lap beam as a yarn sheet, and in particular, onto a dyeing beam, said apparatus having a pressure means that applies pressure to the beam lap during the winding process, which pressure means is mechanically connected with a displacement transducer that emits measurement impulses, said apparatus including a beam-driven shaft encoder that emits a predetermined number of calculation impulses for each revolution of the beam, and with a computer that calculates the partial lengths of laps on the lap beam from the measurement impulses and the calculation impulses, adding them, characterized by the fact that the displacement transducer connected to the pressure means that applies pressure to the beam lap is operatively connected by means of a sliding articulation with a distance staff, which is also hinged so as to have an extension of its longitudinal axis intersect the longitudinal axis of the lap beam, and wherein the computer provides a correction factor that renders it possible to consider the diameter of the axle of the lap beam and the position of the point of articulation of the distance staff with the pressure means that applies pressure with regard to a pressure point in line with the distance staff to accurately calculate the length of textile material wound on the lap beam.

2. An apparatus in accordance with claim 1, characterized by the fact that the distance staff is a toothed rack, one end of which is hinged, by means of an articulated ring at the beam axle of the winding apparatus, and another section of which is held in mesh with a pinion gear of the displacement transducer by a mounting that permits axial movements.

3. An apparatus in accordance with claim 1 or 2, characterized by the fact that the displacement transducer is adjustably interconnected to a supporting arm of the pressure means in the form of a compression roller.

4. An apparatus in accordance with claim 3, characterized by the fact that the distance staff is arranged in line with the pressure means in the form of a compression roller and that the mounting of the distance staff is connected with a supporting arm of the compression roller in such a way as to form an articulated connection.

5. An apparatus in accordance with claim 1, characterized by the fact that the computer includes an adjustment switch of a counter in the computer that is activated by the displacement transducer, and that the counter may be set, prior to commencing winding to the maximum possible distance ($a_{max}$) of the pressure point of the compression roller from the beam axle.

6. An apparatus in accordance with claim 1, characterized by the fact that the computer includes a multiplication element that can be retriggered by a calculation impulse, and which can subsequently calculate the partial length of a lap (lt) from a lap radius (r) determined by means of the measurement impulses and from a constant value (k) that was determined by the number of calculation impulses per lap beam revolution.

7. An apparatus in accordance with claim 2, characterized by the fact that the computer includes a circuit for an electrical signal proportional to the radius of the laps (r) accumulated upon the lap beam, and that such circuit, for purposes of monitoring and/or influencing the hardness of the laps is connected to an indication means and/or controlling or regulating means.

8. An apparatus for measuring the length of filamentous sheet material wound onto a lap beam comprising:
   (a) a roller means arranged and constructed to contact the surface of material wound upon the beam lap,
   (b) said roller means being rotatably mounted upon supporting means and movably interconnected with a rod means the longitudinal axis of which intersects the longitudinal axis of the lap beam,
   (c) a first measurement means interconnected with the roller means for determining the relative position of the roller means with respect to a hub of the lap beam by detecting the longitudinal position of the rod means with respect to said first measurement means,
   (d) means to bias the roller means toward the hub of the lap beam,
   (e) a second measurement means to determine the rotation of the lap beam hub,
   (f) computational means to integrate the measurement of the relative position of the roller means with respect to the hub of the lap beam as determined by the position of said first measurement means longitudinally with respect to the rod means and the rotation of the lap beam hub to determine the length of textile material wound upon the lap beam.

9. An apparatus in accordance with claim 8 wherein the rod means comprises a toothed rack interengaged with a pinion gear of the first measurement means.

10. An apparatus in accordance with claim 9 additionally comprising a pressure means to urge the roller means toward the hub of the lap beam.

11. An apparatus in accordance with claim 10 wherein the rod means is connected to the hub of the lap beam at one end and to the pinion gear at a point between its two ends.

12. An apparatus in accordance with claim 11 wherein the pinion gear is connected with the first measurement means in the form of a displacement transducer to measure the relative movement of the toothed rack and through it the relative distance of the roller means from the lap beam hub.

13. An apparatus in accordance with claim 8 wherein the rod means takes the form of a toothed rack movably interengaged with a pinion gear which is at least indirectly connected to the first measurement means.

14. An apparatus in accordance with claim 13 wherein the first and second measurement means are electrical counters and the calculation means is a digital computer.

15. A method of measuring the length of a textile material upon a lap beam comprising:
   (a) initially determining the distance of a roller measuring means from the hub of the lap beam,
   (b) measuring by means of a first counter movably interengaged with a rod means and associated through a relatively short lever means to a roller means, upon which short lever means the first counter is mounted and interconnected with support means in which the roller means is journaled and the longitudinal movement of which rod means substantially intersects the axis of the lap beam, the longitudinal movement of the rod means being directly related to the movement of the roller measuring means as laps are added to the hub of the lap beam such that the measuring means is moved along the rod means to provide a distance measurement, (c) measuring the rotation of the hub of the lap beam by a second counter, (d) combining the signals of the first and second counters and calculating by predetermined calculations in a calculator the amount of textile material wound on the hub of the lap beam by determining the distance of the roller means from the hub and the number of revolutions of the hub of the lap beam.

16. An apparatus for measuring the length of filamentous textile material wound onto a lap beam as a yarn sheet, and in particular, onto a dyeing beam, said apparatus having a pressure means that applies pressure to the beam lap during the winding process, which pressure means is mechanically connected with a displacement transducer that emits measurement impulses, said apparatus including a beam-driven shaft encoder that emits a predetermined number of calculation impulses for each revolution of the beam, and with a computer that calculates the partial lengths of laps on the lap beam from the measurement impulses and the calculation impulses, adding them, characterized by the fact that the displacement transducer of the pressure means that applies pressure is operatively connected by means of a sliding articulation with a distance staff which is also hinged so as to intersect the longitudinal axis of the beam, and the fact that the computer provides a correction factor that renders it possible to consider the diameter of the axle of the lap beam and the position of the point of articulation of the distance staff on the pressure means that applies pressure with regard to a pressure point on the beam, further characterized by the fact that the computer has an outlet for an electrical quantity proportional to the radius of the lap ($r$), and that the outlet, for purposes of monitoring and/or influencing the hardness of the lap, is connected to an indication means and/or controlling or regulating means.

* * * * *